United States Patent
Ives et al.

(10) Patent No.: US 7,434,012 B1
(45) Date of Patent: Oct. 7, 2008

(54) TECHNIQUES FOR MEDIA SCRUBBING

(75) Inventors: Stephen R. Ives, West Boylston, MA (US); Dale R. Elliott, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 230 days.

(21) Appl. No.: 11/231,730

(22) Filed: Sep. 21, 2005

(51) Int. Cl.
  *G06F 12/00* (2006.01)
  *G06F 13/00* (2006.01)
  *G06F 13/28* (2006.01)

(52) U.S. Cl. ...................... 711/159; 711/112
(58) Field of Classification Search ............... None
  See application file for complete search history.

(56) References Cited

U.S. PATENT DOCUMENTS

| | | | |
|---|---|---|---|
| 5,206,939 A | 4/1993 | Yanai et al. | |
| 5,632,012 A * | 5/1997 | Belsan et al. | 714/6 |
| 5,778,394 A | 7/1998 | Galtzur et al. | |
| 5,845,147 A | 12/1998 | Vishlitzky et al. | |
| 5,857,208 A | 1/1999 | Ofek | |
| 6,851,070 B1 * | 2/2005 | Rodrigues et al. | 714/5 |
| 2003/0023808 A1 * | 1/2003 | Bakke et al. | 711/113 |

* cited by examiner

*Primary Examiner*—Reginald G. Bragdon
*Assistant Examiner*—Eric S Cardwell
(74) *Attorney, Agent, or Firm*—Muirhead and Saturnelli, LLC

(57) ABSTRACT

Described are techniques for verifying access to data on a device. A scrubbing deadline is received indicating an ending time by which a current scrubbing cycle is to complete. It is determined whether the scrubbing deadline will be met in accordance with one or more scrubbing criteria if device scrubbing operations are performed in a first mode. Device scrubbing operations are performed in the first mode if it is determined that the scrubbing deadline will be met in accordance with the one or more scrubbing criteria, and otherwise, performing device scrubbing operations in a second mode.

20 Claims, 7 Drawing Sheets

TECHNIQUES FOR MEDIA SCRUBBING

BACKGROUND

1. Technical Field

This application generally relates to data storage, and more particularly to techniques used in connection with verification of devices in a data storage system.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Data storage systems may perform techniques in connection with verifying that one or more devices included therein are physically accessible for obtaining data. These techniques may be referred to as disk or device scrubbing techniques that may be performed to ensure that data on the devices is accessible when needed in connection with processing received I/O operations. Existing device scrubbing techniques may not perform scrubbing operations within an acceptable time period. As a result, media faults may not be discovered in a timely fashion. Existing techniques may also not be flexible to allow for variations in device scrubbing in accordance with each device. Additionally, existing device scrubbing techniques may not acceptably balance device scrubbing with other operations performed by the data storage system.

Thus, it may be desirable to utilize a flexible device scrubbing technique which provides for increased device reliability. It may also be desirable that the technique balance scrubbing operations to reduce adverse effects on other data storage system operations.

SUMMARY OF THE INVENTION

In accordance with one aspect of the invention is a method for verifying access to data on a device comprising: receiving a scrubbing deadline indicating an ending time by which a current scrubbing cycle is to complete; determining whether said scrubbing deadline will be met in accordance with one or more scrubbing criteria if device scrubbing operations are performed in a first mode; and performing device scrubbing operations in said first mode if it is determined that said scrubbing deadline will be met in accordance with said one or more scrubbing criteria, and otherwise, performing device scrubbing operations in a second mode. The second mode may cause an accelerated rate in scrubbing in comparison to said first mode. The one or more criteria may include a tolerance window. The tolerance window may be represented by at least one of a percentage of an amount of time for a scrubbing cycle, or an absolute value. The second mode may cause a larger number of blocks to be scrubbed for a single scrubbing operation than a number of blocks scrubbed for a single scrubbing operation in said first mode. The one or more scrubbing criteria may include one or more of: a scrubbing time interval, a scrubbing cycle time, and a tolerance threshold, said scrubbing time interval indicating a frequency at which a scrubbing operation is issued within a single scrubbing cycle, said scrubbing cycle time indicating a time period for a single scrubbing cycle, and said tolerance threshold indicating an amount of time wherein scrubbing is performed in said second mode if said current scrubbing cycle will not complete within an additional time interval indicated by said tolerance threshold. A recovery multiplier may indicate an accelerated scrubbing rate for said second mode, said first mode including scrubbing a portion of the device of a first size and wherein said second mode includes scrubbing a portion of the device of a second size, said second size being represented as the product of said recovery multiplier and said first size. At least one of said one or more criteria, a portion of said device to be scrubbed, and said recovery multiplier may be configurable. The first mode may issue one or more scrubbing operations in accordance with a specified time interval to complete scrubbing of said current scrubbing cycle by said scrubbing deadline, each of said one or more scrubbing operations including issuing a command to said device to scrub a portion of a first size, and wherein said first size may be increased for said second mode. Portions of said device for which scrubbing is performed may include only those portions which have a corresponding mapped logical device designation. The method may also include: interrupting scrubbing operations in said current scrubbing cycle at a first point in time at a first location on said device; and resuming scrubbing operations for said current cycle at said first location in accordance with restored scrubbing state information corresponding to a scrubbing state at said first point in time. The device may have its scrubbing operations interrupted when offline and may then perform said resuming when said device is brought back online. The device may have a primary adapter and a secondary adapter controlling scrubbing of said device wherein when said primary adapter goes offline and results in said interrupting step, and said secondary adapter may take over performing of scrubbing of said device and performs said resuming step. The device may be a hot spare device for which scrubbing is being performed, said hot spare device may then be swapped in for another failed device and said resuming step may be performed on said hot spare device replacing said other failed device in operations of a data storage system.

In accordance with another aspect of the invention is a computer program product for verifying access to data on a device comprising code that: receives a scrubbing deadline indicating an ending time by which a current scrubbing cycle is to complete; determines whether said scrubbing deadline will be met in accordance with one or more scrubbing criteria if device scrubbing operations are performed in a first mode; and performs device scrubbing operations in said first mode if it is determined that said scrubbing deadline will be met in accordance with said one or more scrubbing criteria, and otherwise, performs device scrubbing operations in a second mode. The second mode may cause an accelerated rate in scrubbing in comparison to said first mode. The second mode may cause a larger number of blocks to be scrubbed for a single scrubbing operation than a number of blocks scrubbed for a single scrubbing operation in said first mode. The one or more scrubbing criteria may include one or more of: a scrubbing time interval, a scrubbing cycle time, and a tolerance threshold, said scrubbing time interval indicating a frequency at which a scrubbing operation is issued within a single scrubbing cycle, said scrubbing cycle time indicating a time period for a single scrubbing cycle, and said tolerance threshold indicating an amount of time wherein scrubbing is performed in said second mode if said current scrubbing cycle will not complete within an additional time interval indicated by said tolerance threshold. A recovery multiplier may indicate an accelerated scrubbing rate for said second mode, said first mode including scrubbing a portion of the device of a first size and wherein said second mode may include scrubbing a portion of the device of a second size, said second size being represented as the product of said recovery multiplier and said first size, and wherein at least one of said one or more criteria, a portion of said device to be scrubbed, and said recovery multiplier may be configurable.

In accordance with another aspect of the invention is a data storage system comprising: one or more data storage devices; and one of more disk adapters associated with one or more of said data storage devices, each of the disk adapters including code for verifying access to data on each of said data storage devices associated with said each disk adapter device, said each disk adapter comprising code that: receives a scrubbing deadline indicating an ending time by which a current scrubbing cycle is to complete; determines whether said scrubbing deadline will be met in accordance with one or more scrubbing criteria if device scrubbing operations are performed in a first mode; and performs device scrubbing operations in said first mode if it is determined that said scrubbing deadline will be met in accordance with said one or more scrubbing criteria, and otherwise, performs device scrubbing operations in a second mode.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
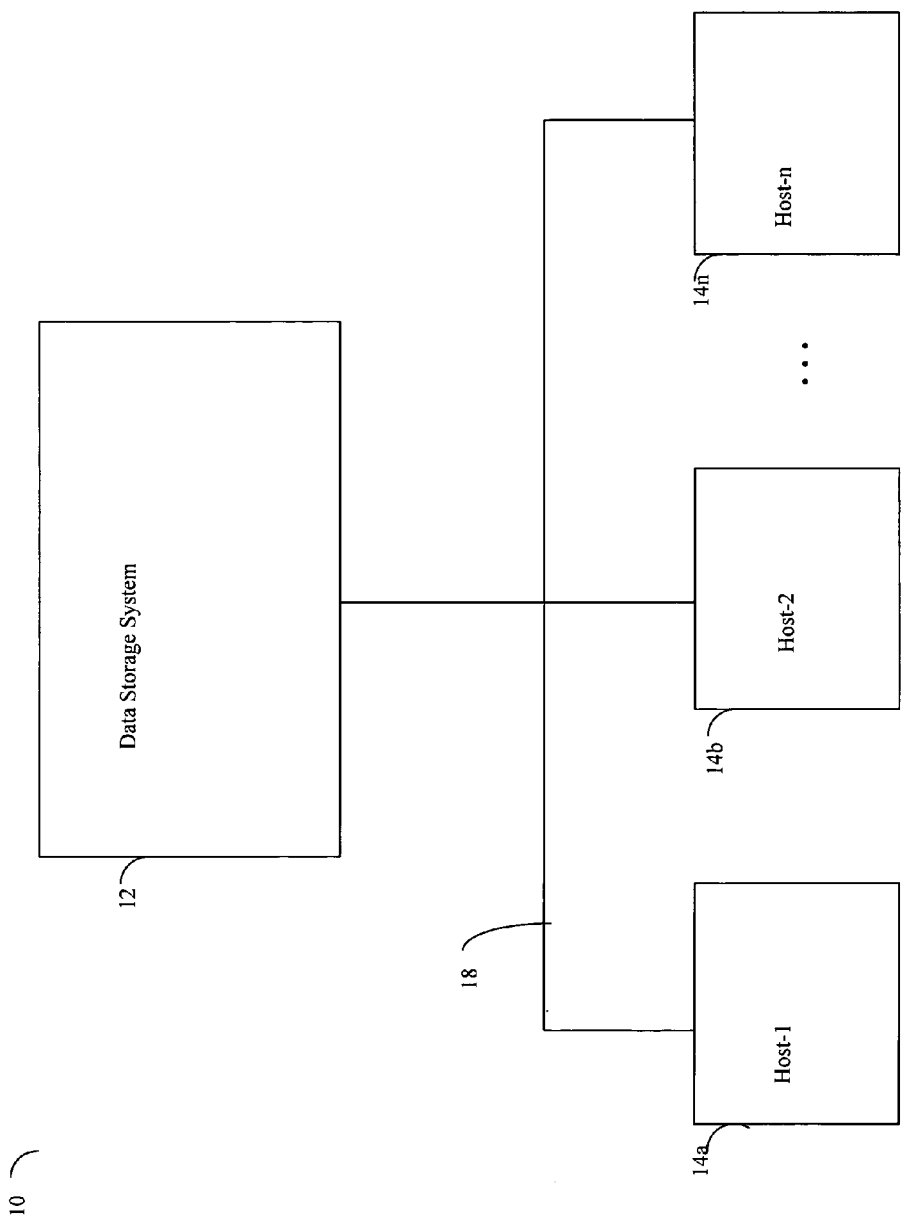
FIG. 1 is an example of an embodiment of a computer system that may utilize the techniques described herein.

Referring now to FIG. 1, shown is an example of an embodiment of a computer system that may be used in connection with performing the techniques described herein. The computer system 10 includes a data storage system 12 connected to host systems 14a-14n through communication medium 18. In this embodiment of the computer system 10, and the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, iSCSI, and the like. Some or all of the connections by which the hosts, management component(s), and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
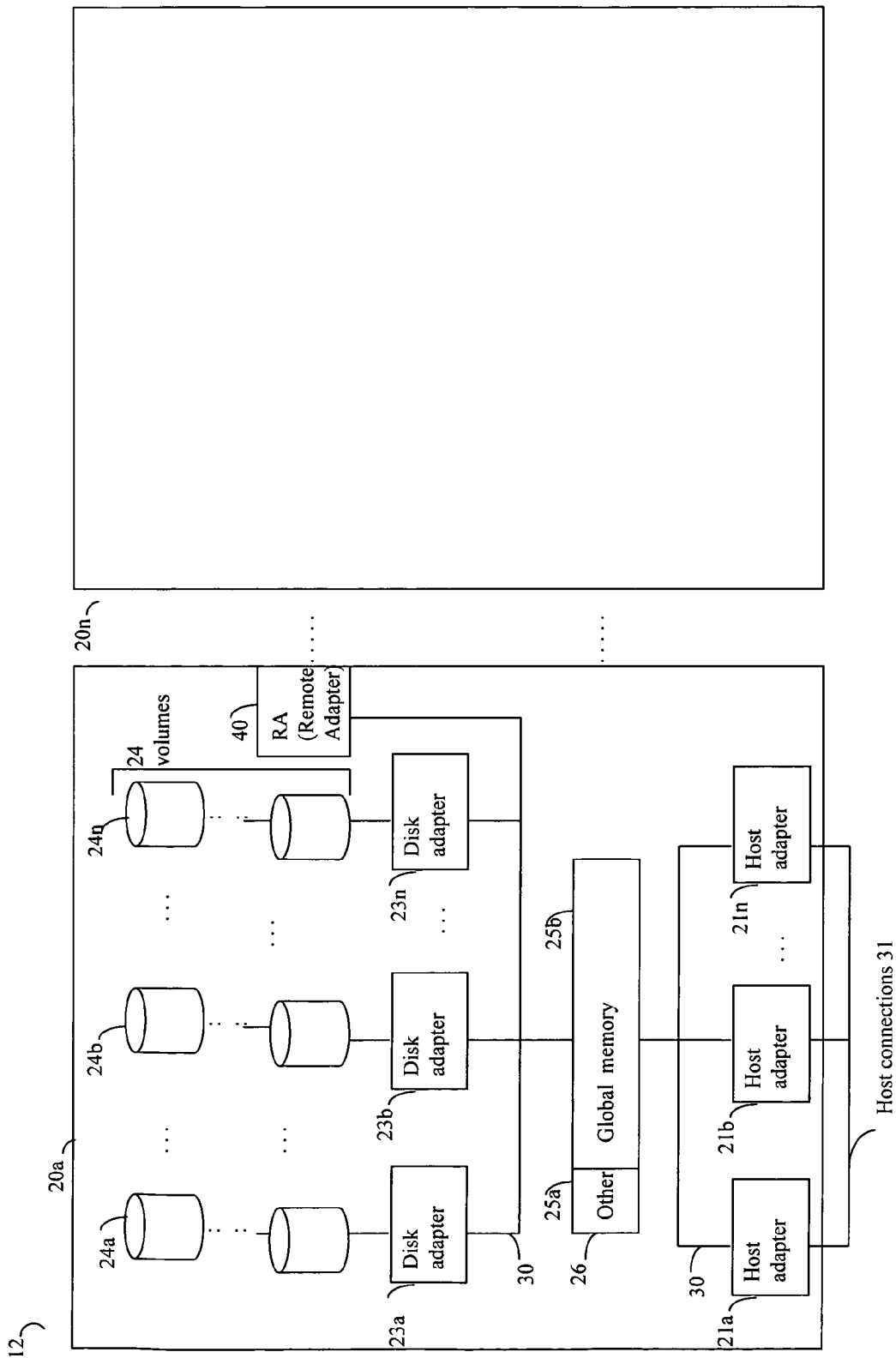
FIG. 2A is an example of an embodiment of a data storage system.

Referring now to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the remote adapters (RA's), the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on an LV may be accessed by the DA following a data request in connection with I/O operations that other directors originate.

Figure 2B:
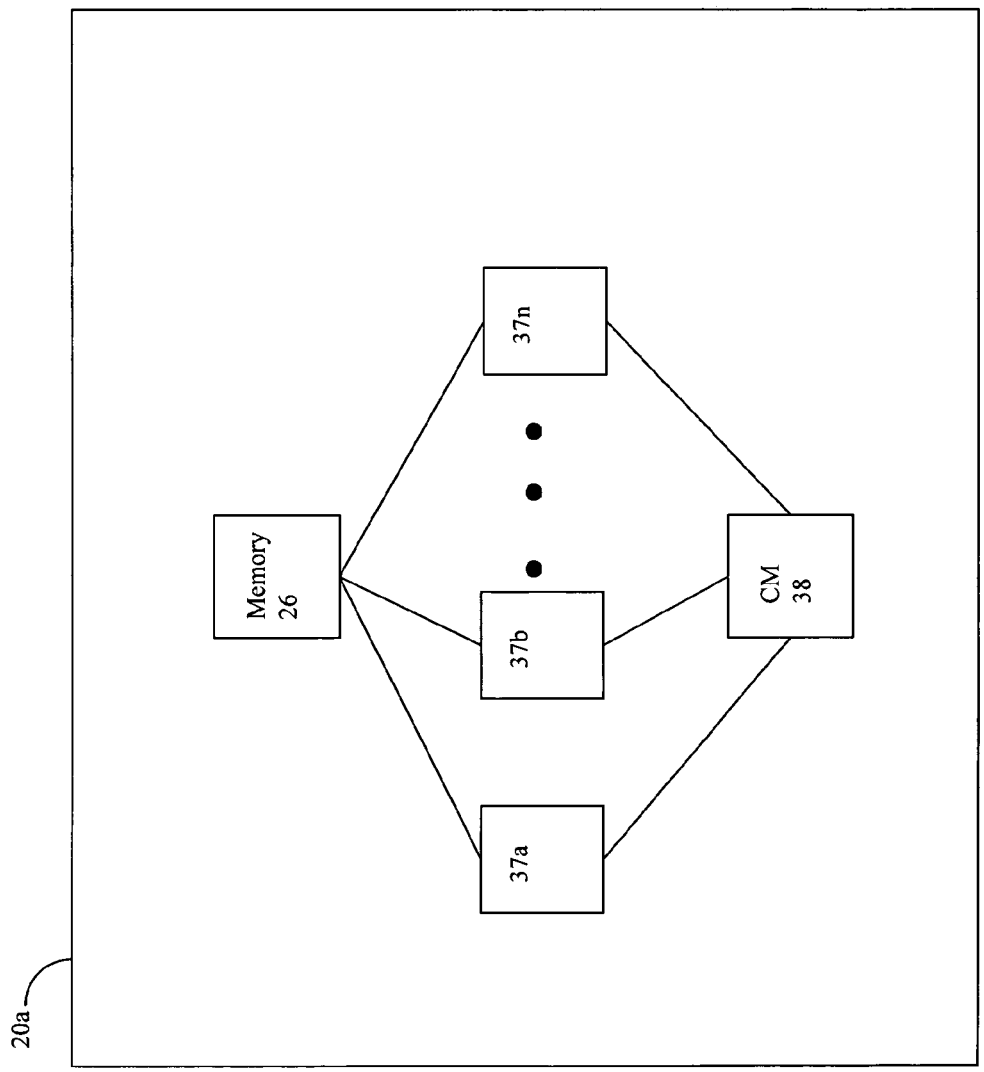
FIG. 2B is a representation of the logical internal communications between the directors and memory included in one embodiment of data storage system of FIG. 2A.

Referring now to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

As known to those of ordinary skill in the art, different techniques may be used in connection with verifying that data on physical devices, such as disks, included in a data storage system is accessible. Disk or device scrubbing techniques may be used in connection with verifying the ability to access and obtain data from physical devices of the data storage systems as described herein.

What will now be described are device scrubbing techniques as may be performed in the data storage system illustrated in FIG. 2A. In one embodiment utilizing the device scrubbing techniques described herein, verify commands are issued for portions of each physical device to verify the ability to access data on the devices of the data storage system. Alternative implementations could use any SCSI command which reads the specified blocks from the drive (such as, for example, READ6, READ10, READ12, READ16, READ32, PREFETCH10, PREFETCH16, VERIFY10, VERIFY12, VERIFY16, VERIFY32, and the like) to achieve the same physical verification effect. Using these other SCSI commands, the DA controller could either ignore any resulting inbound data or perform logical data verification on it, in addition to the drive validating the physical accessibility of the data blocks. In one embodiment, the portion of each physical device which is scrubbed may be configurable from 0% to 100% of the physical device. Alternatively, an embodiment may have portions of physical devices to be scrubbed correspond to non-configurable portions. In one embodiment utilizing SCSI devices, the verify command is a command as defined in accordance with a standard specification. When a verify command is issued to a SCSI device, the device attempts to access and read the data from the physical device in accordance with the specified LBA (logical block address, location of where to start reading the data) and block count (specifying the size of the data portion to be read) as included in the verify command. The physical device reads the data as specified in the verify command but does not return any data in connection with the operation. If the verify command is able to access and read the specified portion of data, then the operation is successful with respect to that portion of the physical device. Otherwise, the operation fails and may indicate a physical device failure, problem with the media therein, and the like. Such device scrubbing techniques may be used to ensure data and physical device reliability and provide for detection of any failures or problems in connection therewith independent of when an I/O operation is issued to portions of the physical devices. Other embodiments may utilize the device scrubbing techniques described herein with other data storage systems and commands in connection with verifying the ability to access and obtain data from the physical devices.

In connection the techniques described in following paragraphs, the scrubbing techniques may be performed by each DA, for each of the physical devices serviced by that DA. Each DA may also retain its own separate scrubbing state information representing the current state of the scrubbing operation with respect to that DA. The scrubbing state information is described in more detail in following paragraphs. As described elsewhere herein, an embodiment may allow the portion of each physical device to be scrubbed to be configurable, or may otherwise have each such portion be non-configurable. In one embodiment in which the portions of the physical devices to be scrubbed are non-configurable, the device scrubbing may be performed for those portions of each physical device allocated for use and may be performed for each physical device on the data storage system. In one embodiment, the space of the physical devices allocated for use may correspond to allocated disk space associated with logical volumes on each physical drive. It should be noted that this space may include space associated with "hot" spare drives, such as, for example, drives that may become operative in the event of another device's failure. In an embodiment in which portions to be scrubbed for each of the physical devices are configurable, a portion representing from 0% to 100% of each physical device capacity may be specified. Such configurable portions may include space which is allocated for use (e.g., as may be associated with a logical device mapping) and/or other space of each physical device (e.g., as may be associated with space that is not mapped to a logical device), as well as space of hot spare drives.

The device scrubbing techniques described herein may operate in accordance with a specified completion date or scrubbing deadline. For example, a scrubbing schedule may be specified where scrubbing operations are performed for certain devices every 30 days, 60 days, or some other specified time period. For designated physical devices, a verify command may be issued at regular defined time intervals. The portion of each physical device designated with each verify command may vary with each device in accordance with the specified scrubbing deadline. In this way, the number of blocks per scrubbing operation is scaled to meet the deadline in accordance with the amount of each physical device to be scrubbed.

The techniques described herein may be performed in one of two modes of operation for each physical device being scrubbed. A first mode may be referred to as the "normal" mode and the second mode may be referred to as the "recovery" mode. When operating in normal mode as will be described in following paragraphs, the DA performing the scrubbing operations determines that the scrubbing will be completed by the associated scrubbing deadline for the physical device. The DA may operate in the recovery mode if the DA determines that the scrubbing deadline will not be met. In this instance, the DA may accelerate its scrubbing processing by increasing the portion of the physical device (e.g., number of blocks) scrubbed in connection with each scrubbing operation (e.g., verify command).

One or more parameters used in connection with the scrubbing techniques may be specified for each defined class or type of physical device. Additionally, one or more of the parameters described herein may also be configurable as may be specified, for example, by a user.

Figure 3:
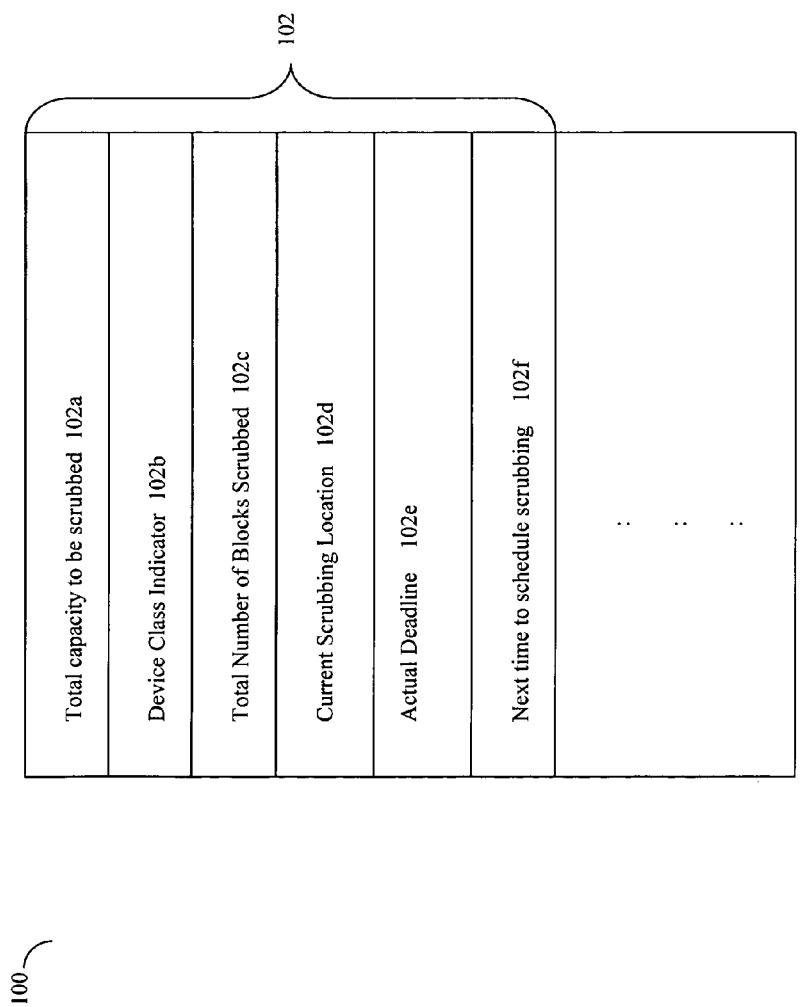
FIGS. 3 and 4 are examples of tables including data that may be used in connection with performing device scrubbing techniques described herein.

Referring now to FIG. 3, shown is an example of an embodiment of a device record as may be stored for each physical device in a data storage system. The illustration 100 defines a table of scrubbing records 102 in which there is a scrubbing record entry 102 for each physical device within a data storage system. The record 102 may include a total capacity to be scrubbed 102a, a device class indicator 102b, the total number of blocks scrubbed 102c, the current scrubbing location 102d, the actual scrubbing deadline 102e, and the next time to schedule scrubbing 102f. The total capacity to be scrubbed 102a may indicate the total amount of space on a physical device which is to be scrubbed. As described elsewhere herein, the value stored in field 102a may configurable or non-configurable. In an embodiment in which 102a is non-configurable, 102a may correspond, for example, to those portions of the physical device which are mapped to logical devices. If 102a is configurable, the value of 102a may represent a configurable portion from 0% to 100% of the physical device capacity. The value included in 102a may be specified in any one of a variety of quantities such as number of blocks, number of bytes, percentage value, and the like. The device class indicator field 102b includes an indicator designating the type of class or category of the physical device drive associated with a particular scrubbing record 102. As described herein, different parameter values used in connection with scrubbing techniques may vary in accordance with the particular device class as specified by the device class indicator 102b. For example, in one embodiment, the device class indicator 102b may specify one of two values indicating one of two defined classes or categories of drives. In one embodiment, a first device classification may be associated with the drives designated as high performance or mission critical drives. The second device classification may be associated with lower performance, non-mission critical drives such as, for example, drives containing back-up data, drives which are less frequently accessed, or drives known to contain data which may be characterized as not critical.

As will be described in more detail herein, the values used in connection with some of the parameters, such as a scrubbing deadline, for the device scrubbing techniques herein may vary with device classification. The total number of blocks scrubbed 102c indicates the total number of blocks or portions of the particular physical device which have been scrubbed so far during a scrubbing cycle. Upon completion of the scrubbing operation, the total number of blocks scrubbed in 102c is equal to the value of the total capacity to be scrubbed 102a. Field 102d indicates the current scrubbing location, for example, by identifying the LBA currently being scrubbed. As will be appreciated by those skilled in the art, the locations to be scrubbed on a physical device may not be contiguous, for example, if all portions of a physical device are not used or mapped to logical devices. In the actual deadline field 102e a date and/or time format may be used to indicate the actual deadline for completing scrubbing of device. The next time to schedule scrubbing 102f may indicate next time at which a scrubbing operation such as, for example, a verify command, is scheduled to be performed.

Figure 4:
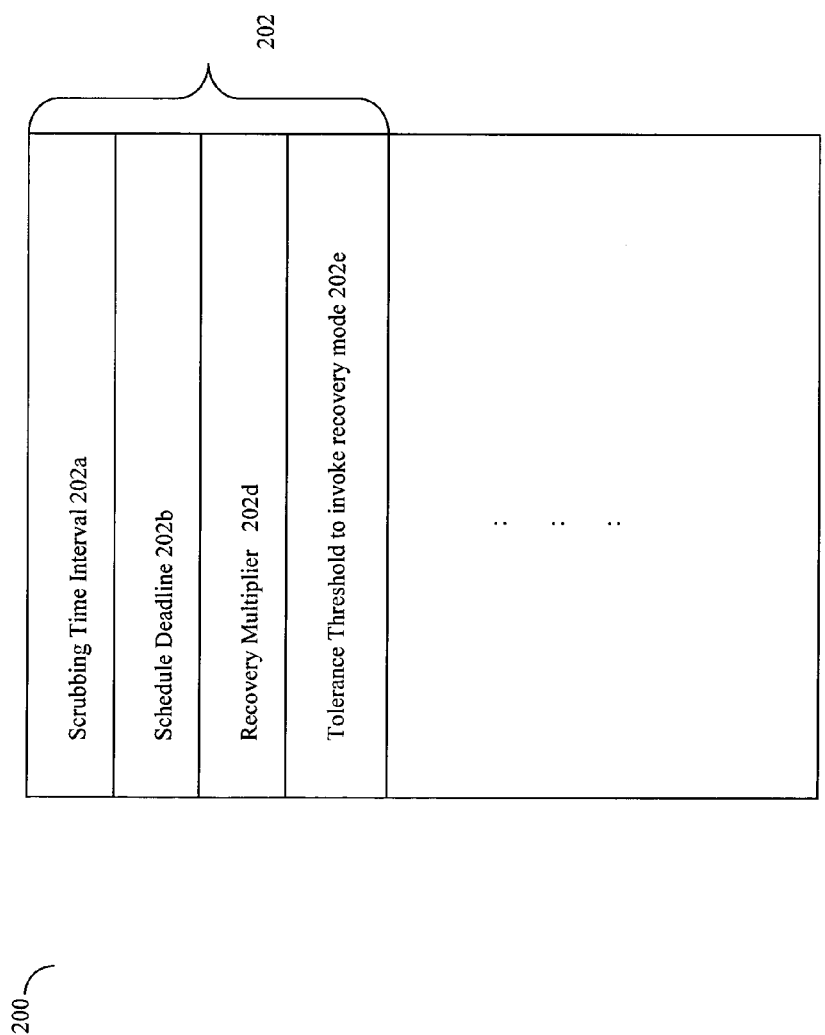

Referring now to FIG. 4, shown is an example of a table of records of scrubbing technique parameter values for defined device classifications. The table 200 includes a record 202 corresponding to each device classification. In one embodiment, the device class indicator 102b as previously described in connection with FIG. 3 may be used to map to a particular one of the records 202 included in table 200. When performing the scrubbing techniques described herein for a particular physical device, processing may be performed to obtain the appropriate scrubbing parameter values from a record 202 of the table 200. Each record 202 includes a scrubbing time interval 202a, a schedule deadline or scrubbing cycle time 202b, a recovery multiplier 202d, and a tolerance threshold to invoke the recovery mode 202e. The scrubbing time interval 202a represents a fixed time period at which a scrubbing operation or command, such as the verify command, is issued for devices of this particular class within a scrubbing cycle. The schedule deadline 202b may specify a value corresponding to a time period or scrubbing cycle time within which the next scrubbing cycle of the device class associated with record 202 is to be completed. For example, the schedule deadline 202b may specify an absolute time in the number of days such as 30 days, 60 days and the like. The schedule deadline 202b may specify a value which is added to a current time to determine an actual scrubbing deadline such as stored in field 102e of a physical device record 102. For example, if a schedule deadline 202b specifies that a scrubbing cycle is to complete every 30 days, the actual deadline 102e specifies a date at a particular point in time 30 days from the current time to indicate the next deadline to complete scrubbing operations for a device associated with record 102. The recovery multiplier 202d is used in determining an accelerated scrubbing rate as associated with the recovery mode as described elsewhere herein when it is determined that a device will not meet its scheduled deadline within the tolerance level specified in field 202e. In one embodiment, the recovery multiplier may specify a value indicating a multiplier value. The recovery multiplier 202d may be, for example, a value which is multiplied by the block count or size associated with a scrub operation during a normal mode. In other words, the recovery multiplier increases the portion of a device that is scrubbed with a single scrubbing operation as issued in accordance with the scrubbing time interval 202a. For example, if the recovery multiplier is 2 and an embodiment in normal mode issues a scrubbing operation to scrub a number of N blocks, when operating in recovery mode, 2N blocks are scrubbed with a single scrubbing operation. The tolerance threshold 202e specifies a value used in determining whether to enter scrubbing recovery mode for a particular drive. The tolerance threshold specifies, for example, a tolerance window which may be expressed in a percentage or other value. The tolerance threshold, as well as one or more other values included in 202, may be configurable or non-configurable parameters in an embodiment. If the DA, for example, would reach its schedule deadline within 10% beyond the originally scheduled deadline, the DA may continue operating in normal mode. In contrast, if, by continuing to execute in normal mode, the DA determines that it would fall too far behind, or more than 10% of the scrubbing cycle time, scrubbing is performed at an accelerate rate in recovery mode.

It should be noted that although record 202 specifies four values that may vary per device class, an embodiment may have a different number of parameter values vary for each device class. For example, an embodiment may use a scrubbing time interval 202a which does not vary per class but rather uses a single interval value for all device classes. Additionally, it should be noted that one or more of the values specified in 202 may be user configurable for one or more device classes. The parameter values may be specified, for example, by a customer using configuration data, APIs, and the like, as may be included in an embodiment to initialize or otherwise redefine parameter values. The particular techniques that may be used in connection with modifying configurable parameters such as those included in 202 may vary in accordance with each embodiment. It should also be noted that in the event one or more of the device or class specific parameters are not specified, a default value may be used.

The device scrubbing techniques described herein may be used to increase data reliability and provide for detection of media faults. The techniques described herein provide the benefit of the foregoing while also balancing received host I/O operations with the scrubbing operations.

In one embodiment, the information stored in table 100 may be stored locally at each DA. Portions of the information included in the table 100 may also be stored, for example, in global memory and in a configuration file. The local copy stored at each DA may be populated using information from GM, a configuration file, and/or other sources as may vary with each embodiment. Each DA may maintain three copies of portions of the scrubbing state information of table 100 for each device. The information for which a DA may maintain three copies includes a subset of each record 102 for each device. In one embodiment, the information which is maintained in each of the three copies includes the current scrubbing location 102d and the actual deadline 102e of the current scrubbing cycle. A first copy of these two fields exists in local control store memory of each DA which may be used, for example, during normal operations when performing scrubbing operations. In one embodiment, this first copy includes the foregoing data items as stored with the physical device information of the table 100 of FIG. 3. A second copy of these two fields may be stored in shared GM of the data storage system. The second copy may be used, for example, during scrubbing initialization, drive fail over and on-line/single director resets. A third persistent copy may exist in each DA's private non-volatile storage, such as NVD or on disk, which may be used, for example, to recover from power cycle events.

What will now be described are processing steps that may be performed in an embodiment utilizing the scrubbing technique parameters during operation of a data storage system.

Figure 5:
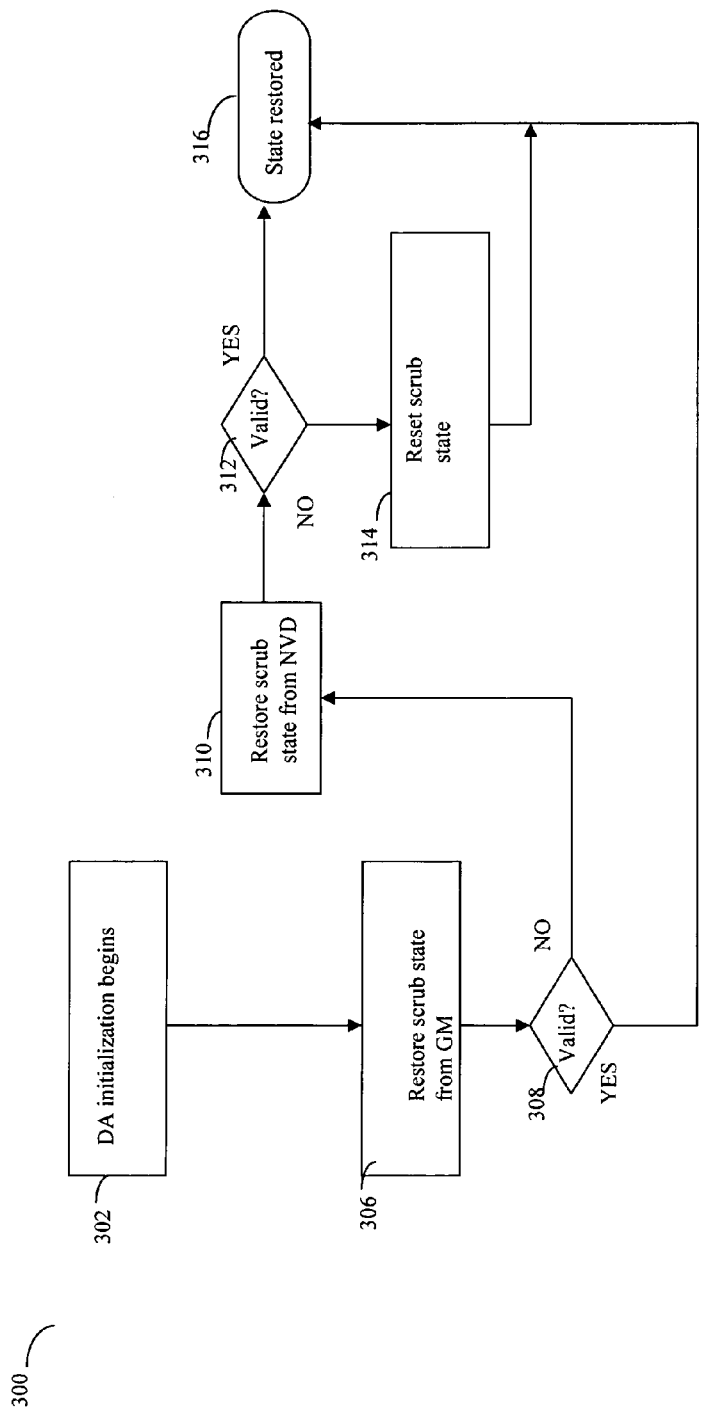
FIGS. 5 and 6 are flowcharts of processing steps that may be performed in an embodiment in connection with performing the device scrubbing techniques described herein.

Referring now to FIG. 5, shown is a flowchart 300 of processing steps that may be performed in an embodiment during scrubbing initialization. The steps of flowchart 300 may be performed by each DA included in a data storage system. The processing of flowchart 300 may be performed, for example, as part of DA initialization which may occur during drive fail over as well as, for example, when a single DA is brought on line or reset. At step 302, DA initialization begins. At step 306, scrub state information is restored from GM. In the embodiment described herein, each DA updates the portion of scrub state information (e.g., 102d and 102e) in GM, non-volatile memory, and a local copy during scrubbing processing within each DA. At step 308, a determination is made as to whether the copy of scrub state information for those restored from global memory is valid. It should be noted that a determination of validity for the values restored from GM may vary with each embodiment. In one embodiment, the actual deadline 102e may denote a date/time format. The value of the restored 102e may be deemed invalid if, for example, a date/time is specified which is beyond some threshold future date/time. The value of the restored 102d may be deemed invalid if, for example, it is not within a valid LBA range corresponding to a logical address space. If the information is determined as being valid at step 308, control proceeds to step 316 where the scrub state is determined as being successfully restored. Otherwise, control proceeds to step 310 where the copy of the scrub state information from non-volatile memory may be used. Step 312 makes a determination as to whether the copy of the scrub state information as may be stored in non-volatile memory local to the DA is valid. It should be noted that the test for validity at step 312 may be the same as described in connection with 308. If the data from non-volatile memory is determined as being valid, control proceeds to step 316 where the scrub state is determined as being successfully restored. Otherwise, if the scrub state as obtained from non-volatile memory from step 310 is determined to be invalid, control proceeds to step 314 where scrub state information is reset. As part of resetting scrub state information at step 314, scrubbing operations for the next scrubbing cycle commence at the start of the device's accessible data space. This is performed rather than continue scrubbing operations from a previous point at which the director went off line or otherwise stopped performing scrubbing operations. Once the scrub state has been reset at step 314, control proceeds to step 316 where it is determined that the scrub state has been successfully restored.

It should be noted that as described herein, part of restoring scrub state information may include restoring or obtaining previous values for 102d and 102e. Additionally, as will be appreciated by those skilled in the art, the processing performed as part of restoring state information at step 310 and resetting the scrub state at step 314 may also include initializing other fields of the records included in the tables 100 and 200.

The processing of flowchart 300 of FIG. 5 may be performed in an embodiment in connection with dual drive initiator fail over. For example, a first DA and a second DA may be specified as a pair where the first DA may be the primary DA. In the event that the first DA fails, a second DA may automatically take over processing operations of the primary DA. The second DA may perform the processing steps of 300 when taking over operations for the primary DA. The processing steps of flowchart 300 of FIG. 5 may also be performed when a director comes on line at other times such as, for example, when a director is added, reinitialized, and the like.

It should be noted that the processing of flowchart 300 may be modified to obtain the scrub state information from non-volatile memory at times when the copy of the information as may be stored in GM is known to be invalid or otherwise non-existent.

Figure 6:
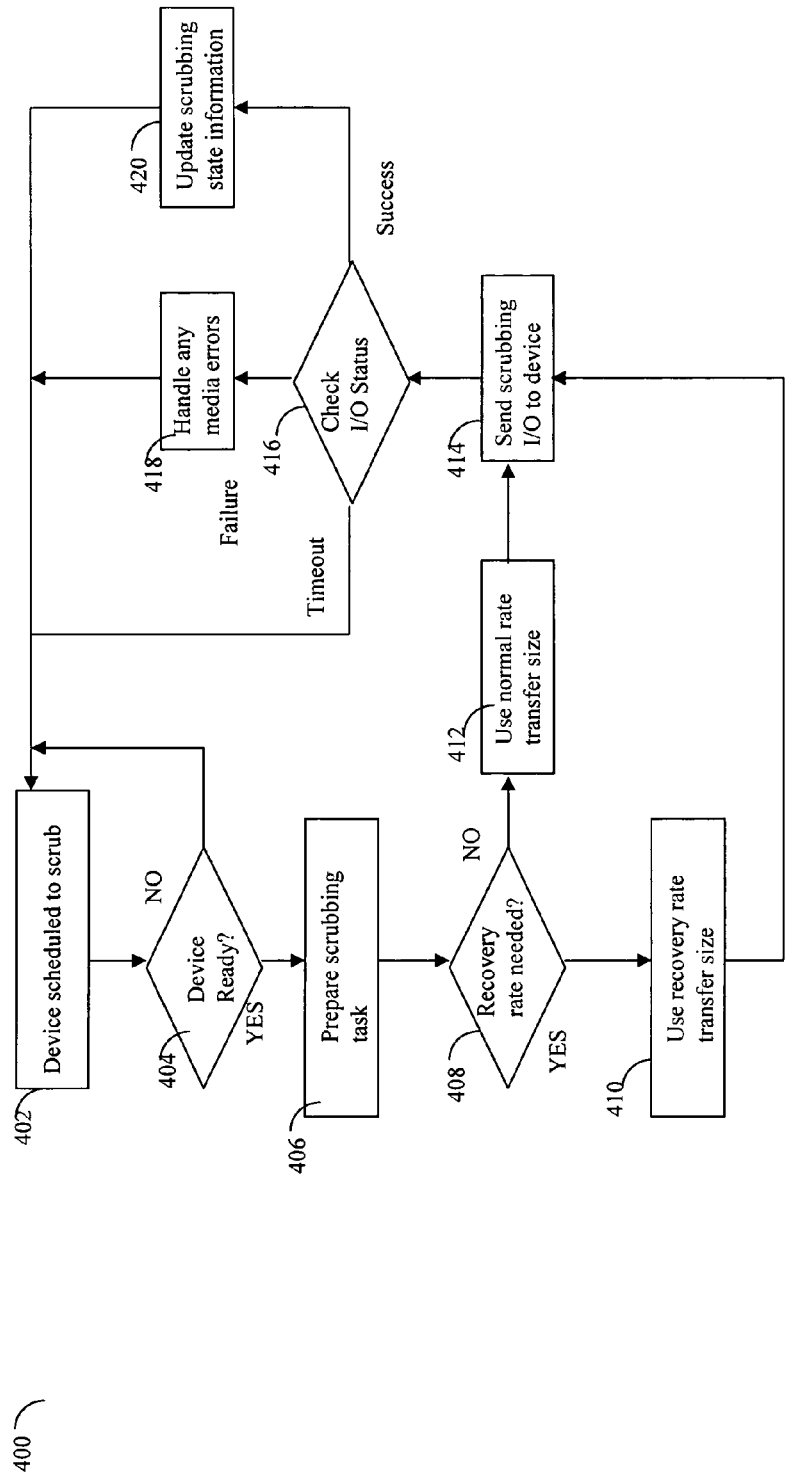

Referring now to FIG. 6, shown is a flowchart 400 of processing steps that may be performed in an embodiment in connection with steady-state scrubbing operations subsequent to initialization. The processing of flowchart 400 may be performed for each scheduled scrubbing operation. At step 402, the physical device is scheduled to be scrubbed at a particular point in time. In one embodiment, a scheduler may determine that it is time to perform a scrubbing operation in accordance with the specified scrubbing time interval 202a for the class of the device. At step 404, a determination is made as to whether the physical device is ready. If not, control proceeds to step 402 to wait until the next scheduled scrubbing interval. If the physical device is determined as ready at step 404, control proceeds to step 406 to prepare the scrubbing task. Step 406 processing may include, for example, allocating storage for, and initializing, a command data block and/or other structures to be used in connection with issuing a scrubbing operation such as the verify command. Part of step 406 processing includes determining the normal rate or size specified for scrubbing operation for the physical device. This may be determined by examining the total capacity to be scrubbed 102a, the schedule deadline 202b and the schedule time interval 202a associated with the physical device. In one embodiment, if the values of 102a, 202a and/or 202b may be configurable, this normal rate or size may be determined with each scheduled scrubbing operation. As described elsewhere herein, the normal rate or size is the portion of the physical device to be scrubbed with each scrubbing operation in order to meet the scheduled deadline. At step 408, a determination is made as to whether the accelerated recovery rate is needed. Step 408 may be determined, for example, by first determining the amount of the physical device left to be scrubbed. This quantity may be represented as:

value of 102a (total capacity to be scrubbed)–value of 102c (total number of blocks scrubbed)

Subsequently, the number of scrubbing operations that may be possibly issue before the scheduled deadline may be determined. The number of scrubbing operations that can be issued prior to the deadline may be represented as:

$$\frac{\text{value of } 102e \text{ (actual deadline time)} - \text{current time}}{\text{value of } 202a \text{ (scrubbing time interval)}}.$$

The foregoing results in the number of scrubbing operations that may be possibly issued before the scheduled actual deadline 102e.

The normal rate or size scrubbed with each scrubbing operation may be multiplied by the number of scrubbing operations (determined above) to yield the total amount of the physical device that may be scrubbed prior to the deadline. If the total amount that may be scrubbed prior to the deadline is not within the specified tolerance threshold as indicated by 202e, recovery mode may be entered. It should be noted that in one embodiment, the tolerance threshold 202e may specify a percentage such as 10%. In the event that it is determined at step 408 that scrubbing of the physical device will not complete within 10% of the original deadline, the recovery rate is used. It should be noted that the tolerance level may be represented as a value obtained by multiplying the tolerance threshold 10% by the defined scrubbing cycle time or deadline as indicated by the schedule deadline parameter 202b.

If step 408 determines that the recovery rate is needed, control proceeds to step 410 to use the recovery rate transfer size. In one embodiment, the recovery rate transfer size may be determined by multiplying the block count or size, for example, used during normal mode by the recovery multiplier 202e. The recovery rate transfer size is then specified in the scrubbing operation I/O sent to the device at step 414. At step 416, the status of the scrubbing operation is determined as one of three different states. The operation may not be performed, for example, due to problems with the physical device such that the operation times out. In this case, control proceeds to step 402 to wait for the next time the physical device is scheduled to be scrubbed. If the status is indicated as a failure, any media errors are handled. Control then proceeds to step 402 to schedule the physical device for the next scrubbing operation and wait for such time to arrive. If the status at step 416 is determined to be successful, control proceeds to step 420 to update scrubbing state information. This update processing performed at step 420 may include, for example, updating a total number of blocks scrubbed 102c, updating the current scrubbing location 102d, and updating the next time to schedule scrubbing 102f of the DA's local copy of the records of table 100. Additionally, step 420 may include updating one or more copies of state information or portions thereof as may be maintained in one or more locations in an embodiment. In one embodiment, this may include, for example, updating a portion of the physical device information as represented in 102 as may be included in data storage GM, the non-volatile memory of the DA, and a local copy as maintained and used during normal operations of the DA. Additional information included in table 100 of FIG. 3 may also be updated. Control then proceeds from step 420 to step 402. If step 408 determines that recovery rate is not needed, control proceeds to step 412 to use the normal rate transfer size in connection with the scrubbing operation sent to the physical device at step 414.

An embodiment may perform processing to handle and track media errors encountered during scrubbing. For example, in one embodiment, if media errors are encountered during scrubbing, the DA may mark the affected data tracks as "write and verify", and attempt to rewrite these tracks by requesting another copy of the data from elsewhere in the system. Other embodiments may perform other processing in connection with detecting and handling media errors.

In one embodiment. Each of the data storage physical devices being scrubbed may be a dual port device in which a primary DA and a secondary DA may be connected to each data storage device. Each of the DAs may be connected to a device, for example, by a fiber channel link or other communication connection as may be used in an embodiment. The DA-device configuration may be described in a configuration file or other manner that may vary with an embodiment. The device failover condition as described herein may occur, for example, if the primary device of such an arrangement goes offline.

It should be noted that the techniques described herein scale the size of scrubbing operations in accordance with portions of each physical device to be scrubbed. As described herein, the portion of each physical device to be scrubbed may be configurable or non-configurable. In one embodiment in which the portions to be scrubbed are non-configurable, the portions of the physical devices to be scrubbed may correspond to those portions of each physical device which may be allocated, or otherwise accessible for storing data rather than scrubbing the entirety of every storage device including those portions that are inaccessible. In one embodiment, as also described elsewhere herein, the device portions accessible to a user may be determined as those device portions which have a corresponding mapped logical device, and any hot spare drives that may be swapped in, under the assumption that users may only store data at such locations. Accordingly, those portions of the physical devices which are not mapped to logical devices may not be accessible for data use and storage and it may be unnecessary to scrub these unmapped portions of the devices. In an embodiment in which portions to be scrubbed may be configured, the portions of the physical drives to be scrubbed may correspond to 0% to 100% of each physical drive's capacity.

As described herein, one or more different device classifications associated with physical devices may be defined. These classifications may be predefined and may also include more than two as described herein for purposes of illustration. Additionally, an embodiment may also have configurable or user-definable physical device classifications. Additionally, it should be noted that classifications may be defined or based within a general device classification or grouping. For example, there may be a first general classification of devices characterized as mission critical and a second general classification of devices classified as the lower performance or non-mission critical physical devices. Within each of the foregoing two general classifications may be one or more sub-classifications each having an associated set of one or more scrubbing parameters and accordingly each having a corresponding record 102 in the table 100 of FIG. 3.

It should be noted that an embodiment may also perform processing that combines one or more pending I/O operations or requests for each DA. For example, a queue may exist for storing pending I/O requests to be processed by a DA. This queue may have a finite amount of storage or depth. In the event that the queue reaches some defined threshold, for example, multiple pending I/O operations in the queue may be combined into a single operation having a larger block count or size for the same operation. For example, if there are multiple scrub commands within the queue, these multiple scrub commands may be combined into a single operation request. The particular techniques in balancing the depth of the queue that may be maintained for those pending I/O requests of each device and associated thresholds may vary with each embodiment.

The recovery mode as described herein utilizing an accelerated recovery rate transfer size may be invoked, for example, after a physical device that fails subsequently comes back on line. Scrubbing operations may attempt to continue from the previous point of physical device failure in accordance with a previously established deadline. Depending upon the amount of time that the physical device has been off line, the physical device may continue scrubbing in accordance with its previously specified deadline by operating in the enhanced or recovery rate in order to meet the previously established deadline. When operating in the recovery mode, there is a trade off where the performance of a data storage system for performing other I/O operations may be affected at the expense of performing scrubbing operations in order to maintain data reliability.

It should be noted that any one of a variety of different techniques may be used in an embodiment in order to determine when a particular physical device is online/off line and/or when a physical device is operational, or not. In one embodiment, one or more of the directors, including DAs, may communicate their statuses with each other using GM. At defined time intervals when active, each DA writes a particular value to a specified portion of GM which is then readable by all of the other directors to indicate that the writing director is online. The foregoing process, where each director writes a value at specified time intervals to GM, may be characterized as a heartbeat signal indicating that the writing director is alive and operational. Using the heartbeat technique, a secondary DA may determine, for example, when its paired primary DA has gone off line. Similarly, the use of the heartbeat or other technique may be used by the secondary DA to determine when the primary DA has come back on line and, hence, the second DA may then stop handling operations for the primary DA. As described above, the particular pairing of physical devices and DAs, such as specification of a primary and secondary DA pairing as well as which physical devices are associated with particular DAs, may be defined in a configuration file. This configuration file may be stored in any one or more different locations within a data storage system such as, for example, GM.

In one embodiment, the secondary device which may come on line in the event that a primary device goes off line may be referred to as a hot spare drive. The hot spare drive may not actually be used until the associated primary device fails. When the hot spare drive such as the secondary device is not invoked or in use, an embodiment may allocate and scrub all portions of the hot spare device even though it is currently not actually in used. Once the hot spare device is activated and mapped for use replacing an existing failed primary drive, scrubbing operations of the hot spare device may continue with only those portions of the drive which are now mapped for use by the user. In other words, if the device scrubbing technique for a hot spare device is interrupted, scrubbing operations for the hot spare device may later resume where processing was interrupted. However, rather than continue scrubbing the entire hot spare device now that the hot spare device is mapped in accordance with user accessible data portions (e.g., such as logical devices), only those user accessible portions (e.g., allocated or mapped portions) are subsequently scrubbed.

An embodiment may vary which parameters are configurable/non-configurable per physical device(s) and/or device class(es). For example, an embodiment may have certain parameters associated with the device scrubbing techniques described herein which are configurable/non-configurable for one or more device classes and/or devices, and also designate a second set of parameters which are configurable/non-configurable for other devices classes and/or devices.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for verifying access to data on a device comprising:
   receiving a scrubbing deadline indicating an ending time by which a current scrubbing cycle is to complete;
   determining, in accordance with one or more scrubbing criteria, whether said scrubbing deadline will be met if device scrubbing operations are performed in a first mode, said one or more scrubbing criteria including a tolerance window indicating an amount of time, said determining including determining whether said current scrubbing cycle will complete within said amount of time beyond said scrubbing deadline; and
   performing device scrubbing operations in said first mode if it is determined that, in accordance with said one or more scrubbing criteria, said current scrubbing cycle will complete within said amount of time beyond said scrubbing deadline, and otherwise, performing device scrubbing operations in a second mode.

2. The method of claim 1, wherein said second mode causes an accelerated rate in scrubbing in comparison to said first mode.

3. The method of claim 1, wherein said tolerance window is represented by at least one of a percentage of an amount of time for a scrubbing cycle, or an absolute value.

4. The method of claim 2, wherein said second mode causes a larger number of blocks to be scrubbed for a single scrubbing operation than a number of blocks scrubbed for a single scrubbing operation in said first mode.

5. The method of claim 1, wherein said one or more scrubbing criteria includes one or more of: a scrubbing time interval, and a scrubbing cycle time, said scrubbing time interval indicating a frequency at which a scrubbing operation is issued within a single scrubbing cycle, said scrubbing cycle time indicating a time period for a single scrubbing cycle.

6. The method of claim 5, wherein said one or more scrubbing criteria are a first set of scrubbing criteria specified for a first class of devices, and second set of different scrubbing criteria is specified for a second class of devices, said second class being different from said first class.

7. A method for verifying access to data on a device comprising:
   receiving a scrubbing deadline indicating an ending time by which a current scrubbing cycle is to complete;
   determining whether said scrubbing deadline will be met in accordance with one or more scrubbing criteria if device scrubbing operations are performed in a first mode; and
   performing device scrubbing operations in said first mode if it is determined that said scrubbing deadline will be met in accordance with said one or more scrubbing criteria, and otherwise, performing device scrubbing operations in a second mode, wherein said one or more scrubbing criteria includes one or more of: a scrubbing time interval, a scrubbing cycle time, and a tolerance threshold, said scrubbing time interval indicating a frequency at which a scrubbing operation is issued within a single scrubbing cycle, said scrubbing cycle time indicating a time period for a single scrubbing cycle, and said tolerance threshold indicating an amount of time wherein scrubbing is performed in said second mode if said current scrubbing cycle will not complete within an additional time interval indicated by said tolerance threshold, and wherein a recovery multiplier indicates an accelerated scrubbing rate for said second mode, said first mode including scrubbing a portion of the device of a first size and wherein said second mode includes scrubbing a portion of the device of a second size, said second size being represented as the product of said recovery multiplier and said first size.

8. The method of claim 7, wherein at least one of said one or more criteria, a portion of said device to be scrubbed, and said recovery multiplier are configurable.

9. The method of claim 1, wherein said first mode issues one or more scrubbing operations in accordance with a specified time interval to complete scrubbing of said current scrubbing cycle by said scrubbing deadline, each of said one or more scrubbing operations including issuing a command to said device to scrub a portion of a first size, and wherein said first size is increased for said second mode.

10. The method of claim 1, wherein portions of said device for which scrubbing is performed include only those portions which have a corresponding mapped logical device designation.

11. The method of claim 1, further comprising:
   interrupting scrubbing operations in said current scrubbing cycle at a first point in time at a first location on said device; and
   resuming scrubbing operations for said current cycle at said first location in accordance with restored scrubbing state information corresponding to a scrubbing state at said first point in time.

12. The method of claim 11, wherein said device has its scrubbing operations interrupted when offline and then performs said resuming when said device is brought back online.

13. The method of claim 11, wherein said device has a primary adapter and a secondary adapter controlling scrubbing of said device wherein said primary adapter goes offline and results in said interrupting step, and said secondary adapter takes over performing of scrubbing of said device and performs said resuming step.

14. The method of claim 11, wherein said device is a hot spare device for which scrubbing is being performed, said hot spare device then being swapped in for another failed device and said resuming step being performed on said hot spare device replacing said other failed device in operations of a data storage system.

15. A computer readable medium comprising code stored thereon for verifying access to data on a device, the computer readable medium comprising code stored thereon that:
receives a scrubbing deadline indicating an ending time by which a current scrubbing cycle is to complete;
determines, in accordance with one or more scrubbing criteria, whether said scrubbing deadline will be met if device scrubbing operations are performed in a first mode, said one or more scrubbing criteria including a tolerance window indicating an amount of time, said code that determines including code that determines whether said current scrubbing cycle will complete within said amount of time beyond said scrubbing deadline; and
performs device scrubbing operations in said first mode if it is determined that, in accordance with said one or more scrubbing criteria, said current scrubbing cycle will complete within said amount of time beyond said scrubbing deadline, and otherwise, performs device scrubbing operations in a second mode.

16. The computer readable medium of claim 15, wherein said second mode causes an accelerated rate in scrubbing in comparison to said first mode.

17. The computer readable medium of claim 16, wherein said second mode causes a larger number of blocks to be scrubbed for a single scrubbing operation than a number of blocks scrubbed for a single scrubbing operation in said first mode.

18. The computer readable medium of claim 15, wherein said one or more scrubbing criteria includes one or more of: a scrubbing time interval, and a scrubbing cycle time, said scrubbing time interval indicating a frequency at which a scrubbing operation is issued within a single scrubbing cycle, said scrubbing cycle time indicating a time period for a single scrubbing cycle.

19. A computer readable medium comprising code stored thereon for verifying access to data on a device, the computer readable medium comprising code stored thereon that:
receives a scrubbing deadline indicating an ending time by which a current scrubbing cycle is to complete;
determines whether said scrubbing deadline will be met in accordance with one or more scrubbing criteria if device scrubbing operations are performed in a first mode; and
performs device scrubbing operations in said first mode if it is determined that said scrubbing deadline will be met in accordance with said one or more scrubbing criteria, and otherwise, performs device scrubbing operations in a second mode, wherein said one or more scrubbing criteria includes one or more of: a scrubbing time interval, a scrubbing cycle time, and a tolerance threshold, said scrubbing time interval indicating a frequency at which a scrubbing operation is issued within a single scrubbing cycle, said scrubbing cycle time indicating a time period for a single scrubbing cycle, and said tolerance threshold indicating an amount of time wherein scrubbing is performed in said second mode if said current scrubbing cycle will not complete within an additional time interval indicated by said tolerance threshold, and wherein a recovery multiplier indicates an accelerated scrubbing rate for said second mode, said first mode including scrubbing a portion of the device of a first size and wherein said second mode includes scrubbing a portion of the device of a second size, said second size being represented as the product of said recovery multiplier and said first size, and wherein at least one of said one or more criteria, a portion of said device to be scrubbed, and said recovery multiplier are configurable.

20. A data storage system comprising:
one or more data storage devices; and
one of more disk adapters associated with one or more of said data storage devices, each of the disk adapters including code for verifying access to data on each of said data storage devices associated with said each disk adapter device, said each disk adapter comprising code that:
receives a scrubbing deadline indicating an ending time by which a current scrubbing cycle is to complete;
determines, in accordance with one or more scrubbing criteria, whether said scrubbing deadline will be met if device scrubbing operations are performed in a first mode, said one or more scrubbing criteria including a tolerance window indicating an amount of time, said code that determines including code that determines whether said current scrubbing cycle will complete within said amount of time beyond said scrubbing deadline; and
performs device scrubbing operations in said first mode if it is determined that, in accordance with said one or more scrubbing criteria, said current scrubbing cycle will complete within said amount of time beyond said scrubbing deadline, and otherwise, performs device scrubbing operations in a second mode.

\* \* \* \* \*